United States Patent
O'Hara et al.

(10) Patent No.: US 10,820,617 B1
(45) Date of Patent: Nov. 3, 2020

(54) ALL INCLUSIVE ELECTROLYTES, VITAMINS, AND PROTEIN POWDER TRAINING SUPPLEMENT

(71) Applicant: Government of the United States, as represented by the Secretary of the Air Force, Wright-Patterson AFB, OH (US)

(72) Inventors: Reginald B O'Hara, Beavercreek, OH (US); Paul Falcone, West Des Moines, IA (US)

(*) Notice: Subject to any disclaimer, the term of this patent is extended or adjusted under 35 U.S.C. 154(b) by 151 days.

(21) Appl. No.: 15/939,397

(22) Filed: Mar. 29, 2018

(51) Int. Cl.
| | |
|---|---|
| A23L 33/155 | (2016.01) |
| A23P 10/40 | (2016.01) |
| A23L 33/175 | (2016.01) |
| A23L 33/16 | (2016.01) |
| A23L 33/125 | (2016.01) |
| A23L 33/18 | (2016.01) |

(52) U.S. Cl.
CPC .......... *A23L 33/155* (2016.08); *A23L 33/125* (2016.08); *A23L 33/16* (2016.08); *A23L 33/175* (2016.08); *A23L 33/18* (2016.08); *A23P 10/40* (2016.08); *A23V 2002/00* (2013.01)

(58) Field of Classification Search
CPC ...... A23L 33/155; A23L 33/18; A23L 33/175; A23L 33/16
USPC ..... 426/648, 72, 73, 74, 810, 590, 656, 594, 426/326
See application file for complete search history.

(56) References Cited

U.S. PATENT DOCUMENTS

| | | |
|---|---|---|
| 671,468 A | 4/1901 | Clayton |
| 4,309,417 A | 1/1982 | Staples |
| 4,322,407 A | 3/1982 | Ko |
| 4,448,770 A | 5/1984 | Epting, Jr. |
| 4,725,427 A | 2/1988 | Ashmead et al. |
| 4,871,550 A | 10/1989 | Millman |
| 4,874,606 A | 10/1989 | Boyle et al. |
| 5,032,411 A | 7/1991 | Stray-Gundersen |
| 5,270,297 A | 12/1993 | Paul et al. |
| 5,294,606 A | 3/1994 | Hastings |
| 5,789,401 A | 8/1998 | McCarty |
| 5,948,772 A | 9/1999 | de la Harpe et al. |
| 6,093,711 A | 7/2000 | de la Harpe et al. |
| 6,136,317 A | 10/2000 | de la Harpe et al. |
| 6,143,301 A | 11/2000 | de la Harpe et al. |
| 6,251,889 B1 | 6/2001 | de la Harpe et al. |
| 6,329,361 B1 | 12/2001 | McCarty |
| 6,413,558 B1 | 7/2002 | Weber et al. |
| 6,432,942 B2 | 8/2002 | de la Harpe et al. |
| 6,455,511 B1 | 9/2002 | Kampinga et al. |
| 6,471,998 B2 | 10/2002 | de la Harpe et al. |
| 6,485,764 B2 | 11/2002 | Robergs et al. |
| 6,689,383 B1 | 2/2004 | Anderson et al. |
| 6,809,115 B2 | 10/2004 | Katz et al. |
| RE39,480 E | 1/2007 | McCarty |
| 7,160,565 B2 | 1/2007 | Rifkin |
| 7,767,239 B1 | 8/2010 | Dullien et al. |
| 8,062,677 B2 | 11/2011 | Komorowski |
| 8,518,469 B2 | 8/2013 | MacDonald et al. |
| 8,993,032 B2 | 3/2015 | Xu et al. |
| 8,999,424 B2 | 4/2015 | Ferrante et al. |
| 9,028,879 B2 | 5/2015 | Komorowski |
| 9,119,835 B2 | 9/2015 | Komorowski |
| 9,468,645 B2 | 10/2016 | Owoc |
| 2002/0176881 A1 | 11/2002 | Verlaan et al. |
| 2006/0210688 A1 | 9/2006 | Mower |
| 2007/0095867 A1 | 5/2007 | Tomlin |
| 2009/0041911 A1 | 2/2009 | Gamay |
| 2009/0110674 A1 | 4/2009 | Loizou |
| 2011/0280988 A1 | 11/2011 | Ivy |
| 2012/0263826 A1* | 10/2012 | Fang et al. |
| 2013/0330309 A1 | 12/2013 | Faulkner-Edwards |
| 2014/0093586 A1 | 4/2014 | Dolhun |
| 2014/0294788 A1 | 10/2014 | Bailey et al. |
| 2014/0357576 A1* | 12/2014 | Breuille et al. |

(Continued)

FOREIGN PATENT DOCUMENTS

EP    1235835 A1    9/2002

OTHER PUBLICATIONS

SRAS, "Sports Drinks: is the Sugar Needed?" www.srasanz.org/sras/news-media-faq/sras-articles/sorts-drinks-sugar-needed. (Year: 2014).*

*Primary Examiner* — Helen F Heggestad
(74) *Attorney, Agent, or Firm* — AFMCLO/JAZ; Timothy M. Barlow

(57) ABSTRACT

A water-soluble, meal-replacement performance powder comprising essential vitamins, minerals, and nutrients per United States Department of Agriculture (USDA) 100% recommended daily intake (RDI) guidelines, plus amino acids, electrolytes, hydrolyzed protein, natural caffeine, theacrine, L-leucine, amylopectin/chromium complex, and a bacterial stat. Based on a 2000 kilocalorie diet (all weights approximate), essential vitamins include vitamin A (5000 IU), vitamin B6 (2 mg), vitamin B12 (6 mcg), vitamin C (500 mg), vitamin D (400 IU), vitamin E (30 IU), vitamin K (80 mcg), biotin (300 mcg), folate (400 mcg), niacin (20 mg), pantothenic acid (10 mg), riboflavin (1.7 mcg), and thiamine (1.5 mcg); essential minerals include calcium (500 mg), chromium (120 mcg), copper (2 mg), iodine (150 mcg), magnesium (200 mg), manganese (2 mg), molybdenum (75 mcg), potassium (1500 mg), sodium (1730 mg), and zinc (15 mg); and essential nutrients include protein (40 g). A single serving package includes about 430 kilocalories.

13 Claims, No Drawings

(56) References Cited

U.S. PATENT DOCUMENTS

| | | |
|---|---|---|
| 2015/0080328 A1* | 3/2015 | Villarreal et al. |
| 2015/0132280 A1* | 5/2015 | Lopez et al. |
| 2016/0213673 A1 | 7/2016 | Bartos et al. |
| 2017/0239267 A1* | 8/2017 | Komorowski et al. |

* cited by examiner

ALL INCLUSIVE ELECTROLYTES, VITAMINS, AND PROTEIN POWDER TRAINING SUPPLEMENT

GOVERNMENT INTEREST

The invention described herein may be manufactured and used by or for the Government of the United States for all governmental purposes without the payment of any royalty.

FIELD OF THE INVENTION

The present invention relates to generally to the field of dietary supplements designed for human consumption. More specifically, this invention pertains to methods of packaging and administering dietary supplements in effective amounts to sustain human activity.

BACKGROUND OF THE INVENTION

Special operations (SO) units in the armed forces of the United States (US) include the Army Green Berets, Army Night Stalkers, Army Rangers, Navy SEALs, Marine MARSOC, Marine RECON, and Air Force Special Tactics (ST), for example. Special operations include those military operations characterized as unconventional, and that are carried out by dedicated SO forces using unconventional methods and resources.

Special operators engage in a variety of missions, some of which may require high-energy expenditure and may result in overexertion, both physically and mentally. The activities and duration of a given mission are dictated by the operational unit assigned and are based on the unit's mission. Common duration of sustained operations (SUSOPs) may range between 48-72 hours, depending on the mission. Typical mission activity may require a special operator, for example, to ascend and descend a mountainous terrain of between 10,000 to 25,000 feet in hot and humid conditions, while carrying personal protective equipment (PPE) weighing up to 120 lbs.

Predictably, special operators' high energy expenditure, underfeeding, heavy equipment loads, and environmental factors during SUSOPS can lead to changes in body composition and physical performance decrements, which in turn may result in musculoskeletal injuries and mission mishaps. For example, due to operational stressors, loss of lean muscle tissue and decrements in muscular strength have been reported for SUSOPs lasting as little as 72 hours.

Considering specifically the stated mission of US Air Force Special Tactics (ST), this unit's specially-trained airmen are expected to infiltrate into any variety of permissive and non-permissive enemy threat environments, including all biomes via any available method. These methods include, but are not limited to, parachute, all-terrain vehicle, helicopter, open/closed circuit underwater infiltration, and "dismounted" methods (e.g., ski tour, snow-shoe, hike). In these circumstances, and especially dismounted scenarios, minimizing gear weight to reduce strain on the human body is essential because doing so may expand operational radius and functionality.

During some tactical operations, ST airmen may conduct long duration movements on strict timelines that preclude time to stop and consume adequate food sustainment. Additionally, during longer kinetic engagements that may last several hours, ST airmen may sometimes be unable to eat due to the tactical situation. However, these airmen are typically wearing a military-issued hydration (e.g., bladder) system and are consuming liquids while still maintaining tactical security and integrity with hands on a weapon, immediately able to engage targets of opportunity.

Currently, most warfighters consume water during high intensity operations. Water is procurable in most biomes (e.g., even in a desert environment, troops may negotiate with sympathetic indigenous populations to gain access to wells), negating water weight requirements. Although consistent water consumption plays a major role in preventing heat injury, water alone may not be sufficient to prevent exertional heat illness, and may instead cause a condition known as hyponatremia, defined by a serum sodium concentration of less than 135 mmol/L. Nutritional sustainment beyond mere hydration is also critical.

Unlike water, nutritional sustainment is more difficult to procure and pack. A long-term staple in the food technology used to support SUSOPS is the Meal, Ready-to-Eat (MRE). An MRE is a self-contained, individual field ration in lightweight packaging provided by the United States military to its service members for use in combat or other field conditions where organized food facilities are not available. One MRE weighs between 1 and 1.5 pounds each, and takes up significant volume in an operator's rucksack. Consequently, food weight and size for an extended duration mission (for example, 3 to 5 days, or more) can become a significant detrimental factor.

In the deployed environment, ST airmen may have access to caffeine supplements and protein supplements, but packaging options and nutritional deficiencies of these products are not advantageous to the combat environment. For example, high-sugar carbonated energy drinks provide in excess of 100 milligrams of caffeine in a typical 8 ounces serving, but provide little to no nutritional value and usually contain in excess of 25 grams of sugar. Consuming these products creates the predictable energy spike and subsequent crash that is not conducive to long duration missions requiring steady state endurance and concentration. Additionally, these products come carbonated and packaged in cans, making them all but unpackable for dismounted operations.

Protein supplements typically come in powder packets (or, sometimes, aluminum cans), the contents of which are mixed with water for consumption. Most supplements on the market are very high in sugar and, because many are dairy-based products, are prone to quickly souring in the heat and becoming inconsumable. If mixed in a typical military-issue bladder system, the liquid tends to quickly mold and rot in the apparatus, rendering the bladder equipment unusable. This outcome can significantly endanger a special operator's hydration and, thus, endanger mission success, as extra liquid-carrying apparatuses are rarely packed on combat operations.

The sustenance requirements of SO units share some similarities with the challenges of sustaining endurance performance of participants in extreme sports lasting more than 90 minutes. For example, mountain climbers and ultra-endurance runners typically climb or run non-stop for over 30 hours. In some extreme sports environments, the athletes may have a limited supply of food or MREs and, in some cases, may be exposed to hot and humid environments with no easy access to foods. During highly-stressful exercise in hot and humid environments, the rate of sweat loss increases, and body heat is gained over time. Severe sweating may result in dehydration and may shift both fluid and electrolytes among body compartments. These shifts, as well as increases in body temperatures, represent direct irritants to the central nervous system (CNS) that can additionally affect a subject's perception of exercise.

The 'extreme' user described above is not currently supported by known dietary supplement products and systems, primarily because extreme use scenarios may invite nutrition and/or hydration behaviors that conventional heath maintenance practice would consider physically risky and/or dangerous, including the following:

(a) Using a product as a meal replacement (not merely a supplement) for an extended period;

(b) Using a product as sole sustenance during physically- and/or mentally-taxing activity in difficult conditions (e.g., high tempo, austere environments, high heat); and (c) Using a product on remote and/or long-term missions (e.g., bacteria formation, improper intake due to cognitive impairment).

Therefore, a need exists for an easy-to-use, high-calorie meal replacement product that contains vitamins, minerals, and nutrients that may be effectively used by special operations forces during sustained field operations in austere, high-heat environments. Such a product should contain ingredients capable of promoting water absorption and retention, preventing dangerous drops in serum sodium levels during high-tempo field training operations, and preserving lean muscle tissue.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a meal-replacement performance powder designed for oral administration to an adult human subject. The dry, water-soluble composition may include essential vitamins, minerals, and nutrients as defined by United States Department of Agriculture (USDA) 100% recommended daily intake (RDI) guidelines, plus amino acids, electrolytes, hydrolyzed protein, natural caffeine (200 mg), theacrine, and a bacterial stat (such as sodium benzoate). The theacrine may be present in the composition in an amount between about 0.6% and about 2.7% by weight based on a total weight of the composition. The natural caffeine is characterized by an approximate weight in a range of about 100 mg to about 200 mg.

Based on a 2000 kilocalorie diet (all weights approximate), essential vitamins may include vitamin A (5000 IU), vitamin B6 (2 mg), vitamin B12 (6 mcg), vitamin C (500 mg), vitamin D (400 IU), vitamin E (30 IU) vitamin K (80 mcg), biotin (300 mcg), folate (400 mcg), niacin (20 mg), pantothenic acid (10 mg), riboflavin (1.7 mcg), and thiamine (1.5 mcg); essential minerals may include calcium (500 mg), chromium (120 mcg), copper (2 mg), iodine (150 mcg), magnesium (200 mg), manganese (2 mg), molybdenum (75 mcg), potassium (1500 mg), sodium (1730 mg), and zinc (15 mg); and essential nutrients may include protein (40 g). A single serving of the performance powder may include about 430 kilocalories.

The performance powder may further comprise L-leucine (3000 mg), amylopectin/chromium complex (1000 mg), and/or sugar (25 g). The performance powder may further comprise crystalline fructose, maltodextrin, citric acid, stevia, potassium sorbate, and/or a natural flavoring (e.g., lemon-lime, natural berry).

A method aspect of administering the meal replacement described above to an adult human subject may comprise the steps of dissolving a 135 gram (g) amount of the performance powder in a 3-Liter amount of a ready-to-drink liquid, such as water. A method aspect of advantageously using the meal replacement described above may include reducing loss of lean skeletal muscle tissue in the adult human subject, sustaining physical endurance and cognitive function in the adult human subject, preventing accumulation of bacteria within a container configured to carry the ready-to-drink liquid, reducing heat stress in the adult human subject, and/or inducing a sensation of fullness in the adult human subject.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a compound comprising a dietary supplement designed for consumption by an adult human subject, and also to methods of administering an effective amount of that compound to sustain a human while operating in austere, high-heat environments. The powder supplement may be specifically formulated to advantageously enhance a person's energy, performance, and cognition during sustained operations missions in extreme conditions and preserve lean muscle tissue. This sustained training powder supplement may be specifically designed for use during high intensity activity, such as extreme training operations and during SUSOPs.

The invention may comprise a meal replacement in the form of a dry, water-soluble composition including essential vitamins, minerals, and nutrients based on a 2000 kilocalorie daily diet, and augmented by amino acids, electrolytes, hydrolyzed protein, natural caffeine, theacrine, and a bacterial stat. Additional ingredients, such as L-leucine and amylopectin/chromium complex, may complement the primary ingredients' ability to help the human subject sustain physical endurance and cognitive function (as described in more detail below). Means of dispensing the composition may include per-serving apportionment of the supplement for ease-of-use with a bladder-style hydration system. Such a meal replacement compound, and/or a process of using the same, may be practically applied to reduce loss of lean skeletal muscle tissue while mitigating other known risks common to humans engaged in sustained operations (SUSOPS) and extreme sports.

In various embodiments of the present invention, certain ingredients may be considered significant to delivering the desired advantages of the meal replacement as designed. The invention/formulation may include the amount of each ingredient per serving, which is based on 2000 kilocalorie diet. Essential vitamins, minerals, and nutrients in keeping with United States Department of Agriculture (USDA) recommended daily intake (RDI) guidelines may be assumed to be present in all embodiments of the present invention. Augmenting ingredients may be added including amino acids, electrolytes, and hydrolyzed protein, along with natural caffeine and theacrine as effect enhancers. The only three ingredients that do not include the RDI percent daily values may be amylopectin/chromium, theacrine, and L-leucine. In one embodiment, the present invention may also include the following: Crystalline Fructose, Maltodextrin, Citric Acid, Natural Flavor, Stevia, Sodium Benzoate, Potassium Sorbate, BodyBalance™ B.

Certain specific ingredients that may be included in the composition of the present invention, together with ranges of those ingredients meeting the criteria discussed above, in a portion containing from about 13 to 65 grams free amino acids, are set forth in Table 1.

TABLE 1

GENERAL COMPOSITION

| Ingredient | Range | Preferred Range |
|---|---|---|
| Amino Acid | | |
| L-Leucine | 980 mg-3500 mg | 980 mg-3000 mg |
| Vitamins | | |
| Vitamin A | 375 mcg-1,300 mcg | 400 mcg-1000 mcg |
| Vitamin $B_6$ | 0.1 mg-2.0 mg | 1.0 mg-1.7 mg |
| Vitamin $B_{12}$ | 0.4 mcg-2.8 mcg | 1.8 mcg-6 mcg |
| Vitamin C | 30 mg-1000 mg | 500 mg-1000 mg |
| Vitamin D | 5 mcg-10 mcg | 7.5 mcg-10 mcg |
| Vitamin E | 3 mg-12 mg | 10 mg-12 mg |
| Vitamin K | 5 mcg-80 mcg | 45 mcg-80 mcg |
| Biotin | 5 mcg-35 mcg | 20 mcg-30 mcg |
| Folate | 65 mcg-600 mcg | 200 mcg-400 mcg |
| Niacin | 2 mg-18 mg | 8 mg-20 mg |
| Pantothenic Acid | 1.7 mcg-7.0 mcg | 4 mcg-10 mcg |
| Riboflavin | 0.3 mg-1.6 mg | 0.9 mg-1.7 mg |
| Thiamin | 0.2 mg-1.5 mg | 0.9 mcg-1.5 mcg |
| Minerals | | |
| Calcium | 210 mg-1300 mg | 210 mg-500 mg |
| Chromium | 10 mcg-200 mcg | 80 mcg-120 mcg |
| Copper | 0.4 mg-3.0 mg | 0.7 mg-2 mg |
| Iodine | 40 mcg-200 mcg | 120 mcg-150 mcg |
| Magnesium | 30 mg-320 mg | 130 mg-200 mg |
| Manganese | 0.3 mg-5.0 mg | 0.6 mg-2 mg |
| Molybdenum | 15 mcg-250 mcg | 50 mcg-75 mcg |
| Potassium | 2000 mg-3500 mg | 1000 mg-1500 mg |
| Sodium | 1800 mg-5000 mg | 1200 mg-1730 mg |
| Zinc | 5 mg-19 mg | 10 mg-15 mg |
| Nutrients/Trace | | |
| Protein | 45 g-63 g | 15 g-40 g |
| Sugar | 1 g-50 g | 10 g-25 g |
| Amylopectin/chromium | 10 mcg-200 mcg | 500 mg-1000 mg |

ABBREVIATIONS: Milligrams (mg); Micrograms (mcg); International Units (IU)

40 grams of free amino acids in the amounts corresponding to the stated weight percentages may be dry blended at speeds between about 1,500 RPM and 20,000 RPM, using a Waring model No. MX1200TX X-Prep blender, for a period of between about 2 and 3 minutes, until a transition from separate discrete crystals to a fine amorphous uniform powder appearance is achieved. Next, the indicated amounts of vitamins, trace elements, and minerals may be mixed in a dry blender until the milling action reduces these materials to a particle size of between about 2800 and 3000 microns. Thereafter, the indicated amounts of electrolytes and flavoring aids may be weighed and all of the ingredients may be blended in a Waring model No. MX1200TX X-Prep blender-granulator, for a period of about 2 to 3 minutes. To prepare for delivery in liquid form, the blend may be brought up to three liters volume with water.

TABLE 2

Amino Acid Profile

| Amino Acid | | % Total Amino Acids |
|---|---|---|
| Essential | | |
| L-Leucine | | 11% |
| Total essential | | 11% |

| Vitamins/Minerals | % US RDA | Amount |
|---|---|---|
| Vitamin A | 100% | 5000 IU |
| Vitamin $B_6$ | 100% | 2 mg |
| Vitamin $B_{12}$ | 100% | 6 mcg |
| Vitamin C | 100% | 500 mg |
| Vitamin D | 100% | 400 IU |
| Vitamin E | 100% | 30 IU |
| Vitamin K | 100% | 80 mcg |
| Biotin | 100% | 300 mcg |
| Folate | 100% | 400 mcg |
| Niacin | 100% | 20 mg |
| Pantothenic Acid | 100% | 10 mg |
| Riboflavin | 100% | 1.7 mcg |
| Thiamin | 100% | 1.5 mcg |
| Calcium | 100% | 500 mg |
| Chromium | 100% | 120 mcg |
| Copper | 100% | 2 mg |
| Iodine | 100% | 150 mcg |
| Magnesium | 100% | 200 mg |
| Manganese | 100% | 2 mg |
| Molybdenum | 100% | 75 mcg |
| Potassium | 100% | 1500 mg |
| Sodium | 100% | 1730 mg |
| Zinc | 100% | 15 mg |
| Carbohydrate chart | | |
| Sugar | 25 g | |
| Protein | 13 g-65 g | 24 g-40 g |
| Amylopectin/chromium | 20 mcg-200 mcg | 50 mcg-120 mcg |

As mentioned above, embodiments of the present invention may comprise specialized protein and caffeine muscle uptake enhancers. For example, and without limitation, theacrine may be present to activate key signaling pathways in the skeletal muscle tissue that permits gradual uptake of caffeine by working skeletal muscles. Also, for example, and without limitation, amylopectin/chromium may be present to amplify the effects of protein uptake. Also, for example, and without limitation, L-leucine may be present for use in the biosynthesis of proteins. This amino acid is made by the body, and may be broke down into fat structures inside the body and used for additional energy.

In certain embodiments, the present invention may be designed to deliver 430 calories per serving through a liquid form. Due to the high calorie content of the supplemental powder, human subjects may also use the present invention in conjunction with meals ready to eat (MREs). Whether ingested alone or in conjunction with MREs, the present invention may be consumed during long term missions to reduce the loss of lean skeletal muscle tissue and to sustain physical and cognitive performance, due to the inclusion of natural caffeine with specific caffeine enhancers.

The high-calorie, nutrient-dense performance powder may be placed inside the bladder of a standard issue military hydration system and mixed with water and then consumed during high tempo operational training and during sustained operations (SUSOPS). This bacterial stat present in the high-performance powder may prevent accumulation of bacteria from forming inside the bladder of the hydration system.

In another embodiment, the powder formulation if the present invention may include a blend of the hydrolyzed protein and the natural caffeine with several additional ingredients to include amylopectin/chromium and theacrine that may amplify the effects of whey protein uptake into skeletal muscle tissue. The theacrine may be present in the composition in an amount between about 0.6% and about 2.7% by weight based on a total weight of the composition The natural caffeine is characterized by an approximate weight in a range of about 100 mg to about 200 mg. Theacrine may activate key signaling pathways in the skeletal muscle tissue that may permit the gradual uptake of caffeine by the working skeletal muscle tissue to prevent potential jitteriness while improving psychomotor function and physical performance.

The combination of ingredients in the present invention may amount to more than a predictable sum of the previously known ingredients because the powder formulation may contain a complete nutrient profile of all essential vitamins, minerals and protein mixed together with key amino acids that preserve lean body mass and mitigate common known heat illnesses. Key amino acids included in this drink that are not found in other sports drinks include theacrine, and higher doses of caffeine (but not above the Department of Defense recommendation for military personnel, which improve cognition especially during periods of sleep deprivation).

As described above, the embodiments of the present invention may be designed to provide the following advantages in satisfaction of sustenance requirements of users operating in extreme environments:

Reduced loss of lean skeletal muscle tissue;

Sustained physical and cognitive performance;

Prevention of dangerous drops in serum sodium levels (hyponatremia);

Mitigation of physical and cognitive stressors; and

Prevention of accumulation of bacteria in hydration system.

By combining protein with other key vitamins, minerals and electrolytes, use of the present invention may help eliminate the need to drink protein shakes separately after rigorous operational training and during long patrol missions. The combination of all the essential ingredients, in addition to the high caloric content (430 calories), may make this powder drink ideal for Special Operations forces and/or, for example, and without limitation, clinical patients undergoing chemotherapy who have cachexia.

Because the invention acts as a meal replacement, special operators may use the invention to advantageously reduce pack weight by increasing planned duration between MRE consumption. For example, and without limitation, on a 5-day (120 hour) mission operators may plan to consume two (2) MREs per 24-hour period, equaling approximately 15 pounds. Using the present invention, this carry weight may be reduced to one (1) MRE per 24-hour period, reducing meal weight by about 7.5 pounds. To put this in perspective, a single, loaded rifle magazine may weigh about 1.2 pounds. The resultant food weight savings may allow the operator to carry an additional six magazines, or 180 rounds, of ammunition without a weight penalty, which is almost double a standard ammunition load.

During long duration movements that preclude consuming food, and especially during long duration kinetic engagements, operators may use this invention to continuously consume appropriate sustainment while simultaneously shooting, moving, and communicating. This method of sustainment lends itself to extended combat endurance with little, if any, detrimental effect on combat security and operability.

A comparison of the composition of the present invention to that of prior art dietary supplements will now be discussed in detail. Unlike high-sugar, commercially-available supplements meant for short duration burst activity typically found in sporting events, the present invention may provide long-duration nutritional sustainment tailored to the dismounted environment in which operators may be called upon to carry gear loads in excess of 70 pounds for days. Avoiding insulin spike and crash is vital to the operator, and may be possible through use of the present invention.

A method of using the present invention may advantageously deliver transportability, and ease and safety of use. More specifically, the present invention may be dispensed using a standard issued military hydration system, as described above. For example, without limitation, the present invention may be mixed with water, and then may be ready to be consumed. Inclusion of a bacterial stat in the ingredients of the powder supplement may prevent accumulation of bacteria in hydration system.

In one embodiment of the invention, use may include adding 135 grams of prepackaged micro- and macro-nutrient powder mixed with a ready-to-drink liquid into the inside (integrates in-line) of a military issued 3-Liter CamelBak™ hydration system bladder before and during operational field training and SUSOPs. Bacterial stat, which is the sodium benzoate to prevent accumulation of bacteria inside the bladder system, may replace endurance supplements such as Endurox that lack a slow burning protein solution. The bacterial stat may be configured so as not to destroy bladder systems.

Being able to utilize this invention in a government-issued liquid bladder system in any variety of environments, without it rendering the equipment unusable because of molding or souring, ensures equipment sustainment and unfettered use of the hydration system. Operators incur significant operational risk by introducing currently available water-soluble supplements into bladders systems, and typically will not carry sealed aluminum canned drinks because of pack weight and volume restrictions.

Using the invention when reducing overall equipment weight is vital for mission success. ST airmen determine a gear weight threshold based on mission type, duration, infiltration method etc. Ruck needs to be light enough to conduct the mission, but contain enough sustainment to complete the mission.

Using the invention in emergency situations. Escape and evade tactics may require ST Airmen to "dump gear" meaning they will leave/destroy primary equipment, taking only a small survival bag. This facilitates faster movement and agility. Due to long duration supplemental value with little weight/volume penalty, this invention is ideally suited for use in the survival bag. In survival kits, the invention augments freeze-dried food goods that are typically high in carbohydrates.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A performance powder for oral administration to an adult human subject as a meal replacement consisting of:
   essential vitamins, minerals, and nutrients,
   amino acids,
   electrolytes,
   hydrolyzed protein,
   natural caffeine,
   theacrine, and
   a bacteriostatic agent (bacterial stat),
   wherein the composition further comprises L-Leucine characterized by an approximate weight in a range of about 980 mg to about 3000 mg,
   wherein the composition further comprises Amylopectin/chromium characterized by an approximate weight in a range of about 500 mg to about 1000 mg,
   wherein the composition further comprises sugar characterized by an approximate weight in a range of about 10 g to 25 g,
   wherein the bacterial stat comprises sodium benzoate, and one or more of crystalline fructose, maltodextrin, citric acid, stevia, potassium sorbate, and a natural flavoring selected from the group consisting of lemon-lime and natural berry.

2. The performance powder according to claim 1 wherein the essential vitamins, minerals, and nutrients further comprise a respective 100% RDI, based on a 2000 kilocalorie diet for the adult human subject, of each of:
   the essential vitamins including vitamin A, vitamin B6, vitamin B12, vitamin C, vitamin D, vitamin E, vitamin K, biotin, folate, niacin, pantothenic acid, riboflavin, and thiamine;
   the essential minerals including calcium, chromium, copper, iodine, magnesium, manganese, molybdenum, potassium, sodium, and zinc; and
   the essential nutrients including protein.

3. The performance powder according to claim 2 wherein a per-serving amount of the composition includes about 430 kilocalories and further comprises one or more of:
   the biotin characterized by an approximate weight in a range of about 20 micrograms (mcg) to about 30 mcg;
   the calcium characterized by an approximate weight in a range of about 210 milligrams (mg) to about 500 mg;
   the chromium characterized by an approximate weight in a range of about 80 mcg to about 120 mcg;
   the copper characterized by an approximate weight in a range of about 0.7 mg to about 2 mg;
   the folate characterized by an approximate weight in a range of about 200 mcg to about 400 mcg;
   the iodine characterized by an approximate weight in a range of about 120 mcg to about 150 mcg;
   the magnesium characterized by an approximate weight in a range of about 130 mg to about 200 mg;
   the manganese characterized by an approximate weight in a range of about 0.6 mg to about 2 mg;
   the molybdenum characterized by an approximate weight in a range of about 50 mcg to about 75 mcg;
   the niacin characterized by an approximate weight in a range of about 8 mg to about 20 mg;
   the pantothenic acid characterized by an approximate weight in a range of about 4 mg to about 10 mg;
   the protein characterized by an approximate weight in a range of about 15 Grams (g) to 40 g;
   the potassium characterized by an approximate weight in a range of about 1000 mg to about 1500 mg;
   the riboflavin characterized by an approximate weight in a range of about 0.9 mcg to about 1.7 mcg;
   the sodium characterized by an approximate weight in a range of about 1200 mg to about 1730 mg;
   the thiamin characterized by an approximate weight in a range of about 0.9 mcg to about 1.5 mcg;
   the vitamin A characterized by an approximate weight in a range of about 400 mcg to about 1000 mcg;
   the vitamin B6 characterized by an approximate weight in a range of about 1 mg to about 1.7 mg;
   the vitamin B12 characterized by an approximate weight in a range of about 1.8 mcg to about 6 mcg;
   the vitamin C characterized by an approximate weight in a range of about 500 mg to about 1000 mg;
   the vitamin D characterized by an approximate weight in a range of about 7.5 mcg to about 10 mcg;
   the vitamin E characterized by an approximate weight in a range of about 10 mg to about 12 mg;
   the vitamin K characterized by an approximate weight in a range of about 45 mcg to about 80 mcg; and
   the zinc characterized by an approximate weight in a range of about 10 mg to about 15 mg.

4. The performance powder according to claim 2 wherein the natural caffeine is characterized by an approximate weight in a range of about 100 mg to about 200 mg.

5. The performance powder according to claim 1 wherein the theacrine is present in said composition in an amount between about 0.6% and about 2.7% by weight based on a total weight of said composition.

6. A composition for oral administration to an adult human subject as a meal replacement, the composition defined as a solution consisting of:
  water; and
  a solute comprising a performance powder that includes essential vitamins, minerals, and nutrients,
  amino acids,
  electrolytes,
  hydrolyzed protein,
  natural caffeine,
  theacrine, and
  a bacteriostatic agent (bacterial stat),
  wherein the essential vitamins, minerals, and nutrients further comprise a respective 100% RDI, based on a 2000 kilocalorie diet for the adult human subject, of each of:
  the essential vitamins including vitamin A, vitamin B6, vitamin B12, vitamin C, vitamin D, vitamin E, vitamin K, biotin, folate, niacin, pantothenic acid, riboflavin, and thiamine;
  the essential minerals including calcium, chromium, copper, iodine, magnesium, manganese, molybdenum, potassium, sodium, and zinc; and
  the essential nutrients including protein;
  L-Leucine;
  Amylopectin/chromium;
  Sugar; and
  one or more of crystalline fructose, maltodextrin, citric acid, stevia, potassium sorbate, and a natural flavoring selected from the group consisting of lemon-lime and natural berry.

7. The composition according to claim 6 wherein a per-serving amount of the performance powder includes about 430 kilocalories and further comprises one or more of:
  the biotin characterized by an approximate weight in a range of about 20 micrograms (mcg) to about 30 mcg;
  the calcium characterized by an approximate weight in a range of about 210 milligrams (mg) to about 500 mg;
  the chromium characterized by an approximate weight in a range of about 80 mcg to about 120 mcg;
  the copper characterized by an approximate weight in a range of about 0.7 mg to about 2 mg;
  the folate characterized by an approximate weight in a range of about 200 mcg to about 400 mcg;
  the iodine characterized by an approximate weight in a range of about 120 mcg to about 150 mcg;
  the magnesium characterized by an approximate weight in a range of about 130 mg to about 200 mg;
  the manganese characterized by an approximate weight in a range of about 0.6 mg to about 2 mg;
  the molybdenum characterized by an approximate weight in a range of about 50 mcg to about 75 mcg;
  the niacin characterized by an approximate weight in a range of about 8 mg to about 20 mg;
  the pantothenic acid characterized by an approximate weight in a range of about 4 mg to about 10 mg;
  the protein characterized by an approximate weight in a range of about 15 Grams (g) to 40 g;
  the potassium characterized by an approximate weight in a range of about 1000 mg to about 1500 mg;
  the riboflavin characterized by an approximate weight in a range of about 0.9 mcg to about 1.7 mcg;
  the sodium characterized by an approximate weight in a range of about 1200 mg to about 1730 mg;
  the thiamin characterized by an approximate weight in a range of about 0.9 mcg to about 1.5 mcg;
  the vitamin A characterized by an approximate weight in a range of about 400 mcg to about 1000 mcg;
  the vitamin B6 characterized by an approximate weight in a range of about 1 mg to about 1.7 mg;
  the vitamin B12 characterized by an approximate weight in a range of about 1.8 mcg to about 6 mcg;
  the vitamin C characterized by an approximate weight in a range of about 500 mg to about 1000 mg;
  the vitamin D characterized by an approximate weight in a range of about 7.5 mcg to about 10 mcg;
  the vitamin E characterized by an approximate weight in a range of about 10 mg to about 12 mg;
  the vitamin K characterized by an approximate weight in a range of about 45 mcg to about 80 mcg; and
  the zinc characterized by an approximate weight in a range of about 10 mg to about 15 mg.

8. The composition according to claim 6 wherein the theacrine is present in said performance powder in an amount about 0.6% and about 2.7% by weight based on a total weight of said performance powder.

9. The composition according to claim 6 wherein the natural caffeine is characterized by an approximate weight in a range of about 100 mg to about 200 mg.

10. The composition according to claim 6 wherein the L-Leucine is characterized by an approximate weight in a range of about 980 mg to about 3000 mg.

11. The composition according to claim 6 wherein the Amylopectin/chromium is characterized by an approximate weight in a range of about 500 mg to about 1000 mg.

12. The composition according to claim 6 wherein the sugar is characterized by an approximate weight in a range of about 10 g to 25 g.

13. The composition according to claim 6 wherein the bacterial stat comprises sodium benzoate.

\* \* \* \* \*